(12) United States Patent
Muth et al.

(10) Patent No.: US 8,308,174 B2
(45) Date of Patent: Nov. 13, 2012

(54) STEERING DEVICE FOR ADJUSTING A WHEEL STEERING ANGLE

(75) Inventors: Norman Muth, Frankenberg (DE); Steffen Linkenbach, Eschborn (DE); Johann Jungbecker, Badenheim (DE)

(73) Assignee: Continental Teves AG & oHG (DE)

( * ) Notice: Subject to any disclaimer, the term of this patent is extended or adjusted under 35 U.S.C. 154(b) by 282 days.

(21) Appl. No.: 12/602,580

(22) PCT Filed: Jun. 4, 2008

(86) PCT No.: PCT/EP2008/056936
§ 371 (c)(1),
(2), (4) Date: May 5, 2010

(87) PCT Pub. No.: WO2008/148817
PCT Pub. Date: Dec. 11, 2008

(65) Prior Publication Data
US 2010/0257971 A1    Oct. 14, 2010

(30) Foreign Application Priority Data

Jun. 4, 2007 (DE) .......................... 10 2007 026 198
Sep. 27, 2007 (DE) .......................... 10 2007 046 633
Feb. 19, 2008 (DE) .......................... 10 2008 010 069
Apr. 14, 2008 (DE) .......................... 10 2008 018 978

(51) Int. Cl.
*B62D 7/18* (2006.01)
(52) U.S. Cl. ................ 280/93.512; 280/5.51; 180/412

(58) Field of Classification Search ............. 280/93.512, 280/93.513, 5.51; 180/409, 41, 411, 412
See application file for complete search history.

(56) References Cited

U.S. PATENT DOCUMENTS

| | | | | |
|---|---|---|---|---|
| 4,557,493 A * | 12/1985 | Sano et al. | ................... | 180/410 |
| 4,566,709 A | 1/1986 | Sano | | |
| 4,572,316 A * | 2/1986 | Kanazawa et al. | ............ | 180/415 |
| 4,719,981 A * | 1/1988 | Miyoshi | ........................ | 180/412 |
| 4,781,262 A * | 11/1988 | Nakamura et al. | ............ | 180/414 |
| 4,860,842 A * | 8/1989 | Yamashita et al. | ............ | 180/414 |
| 4,869,335 A * | 9/1989 | Takahashi | ...................... | 180/412 |
| 5,018,594 A | 5/1991 | Takahashi et al. | | |
| 5,226,499 A * | 7/1993 | Kanazawa et al. | ............ | 180/412 |
| 5,508,921 A * | 4/1996 | Chikuma et al. | ................. | 701/41 |
| 6,144,908 A * | 11/2000 | Yasuda | ............................ | 701/41 |
| 7,073,620 B2 * | 7/2006 | Braun et al. | ................... | 180/410 |

FOREIGN PATENT DOCUMENTS

| | | |
|---|---|---|
| DE | 39 42 494 A1 | 7/1990 |
| DE | 43 34 742 A1 | 4/1995 |
| DE | 603 10 787 T2 | 10/2007 |
| WO | 34 38 086 A1 | 5/1985 |
| WO | WO 2006/117343 A1 | 11/2006 |

* cited by examiner

*Primary Examiner* — Drew Brown
(74) *Attorney, Agent, or Firm* — RatnerPrestia (57) ABSTRACT

A steering device for adjusting a wheel steering angle of a wheel of a motor vehicle is disclosed, which steering device has just one central wheel guide member for changing the wheel steering angle of the wheel and not a plurality of wheel guide members. The length of the wheel guide member can be adjusted, wherein a change in length of the central wheel guide member brings about a change in the wheel steering angle of the wheel.

12 Claims, 5 Drawing Sheets

STEERING DEVICE FOR ADJUSTING A WHEEL STEERING ANGLE

CROSS REFERENCE TO RELATED APPLICATIONS

This application is the U.S. national phase application of PCT International Application No. PCT/EP2008/056936, filed Jun. 4, 2008, which claims priority to German Patent Application No. 10 2007 026 198.7, filed Jun. 4, 2007 and German Patent Application No. 10 2007 046 633.3, filed Sep. 27, 2007 and German Patent Application No. 10 2008 010 069.2, filed Feb. 19, 2008 and German Patent Application No. 10 2008 018 978.2, filed Apr. 14, 2008, the contents of such applications being incorporated by reference herein.

BACKGROUND OF THE INVENTION

1. Field of the Invention

The invention relates to steering systems of motor vehicles. In particular, the invention relates to a steering device for adjusting a wheel steering angle of a wheel of a motor vehicle, a vehicle having such a steering device, the use of a steering device in a vehicle, a method for adjusting a wheel steering angle of a wheel of a motor vehicle, and a program element and a computer-readable medium.

2. Description of the Related Art

Known steering devices for rear-axle steering have, similarly to conventional front-axle steering systems, a steering tie rod which connects the right-hand and left-hand rear wheels to one another. A wheel steering angle is adjusted however by shifting the steering tie rod under electromechanical or electrohydraulic control. However, such steering devices require considerable structural expenditure.

WO 2006/117343 A1 discloses a steering device for adjusting a wheel steering angle of a wheel of a motor vehicle, which steering device is integrated into a conventional wheel suspension system. The wheel-specific steering movement of the two rear wheels is carried out here by using two electric motors.

SUMMARY OF THE INVENTION

An object of the invention is to specify an improved steering device for motor vehicles.

The described exemplary embodiments relate equally to the steering device, the method, the use, the vehicle, the program element and the computer-readable medium.

According to an exemplary embodiment of the invention, a steering device for adjusting a wheel steering angle of a wheel of a motor vehicle is disclosed, which steering device has a central wheel guide member for changing the wheel steering angle of the wheel. The length of the wheel guide member here can be adjusted, wherein a change in length of the wheel guide member brings about a change in the wheel steering angle of the wheel.

In other words, the steering device (and therefore the steering tie rod of the vehicle) has just one central wheel guide member. Both rear wheels or both front wheels are therefore steered by means of an individual actuator.

As a result of the integration of an electromechanically adjustable steering tie rod, the integration of a hydraulic pressure supply unit together with the corresponding piping is dispensed with. Furthermore, in the steering device according to aspects of the invention as a rear-wheel steering system, it is not necessary to change the design of the rear-axle integral mount.

According to a further exemplary embodiment of the invention, the wheel guide member has a drive unit, wherein the length of the wheel guide member can be adjusted by means of the drive unit.

The drive of the wheel guide member is therefore integrated into the wheel guide member.

According to a further exemplary embodiment of the invention, the wheel guide member is a central individual actuator.

According to a further exemplary embodiment of the invention, the steering device also has a steering tie rod with a first steering tie rod end and a second steering tie rod end, wherein the wheel guide member is designed to perform linear, synchronous shifting of the two steering tie rod ends.

According to a further exemplary embodiment of the invention, the wheel guide member is coupled to the two steering tie rod ends via a coupling element and via the steering rod.

According to a further exemplary embodiment of the invention, the steering device also has a joint bearing, wherein the wheel guide member is attached to the integral mounts of the steering device via the joint bearing.

According to a further exemplary embodiment of the invention, the wheel is a rear wheel of the motor vehicle.

In this case, the steering device is therefore an (electromechanically actuable) rear-wheel steering system (ARK).

However, the steering device can also be used to correct or control a front-wheel steering system.

According to a further exemplary embodiment of the invention, the steering device also has a wheel mount for mounting the wheel. The wheel mount is connected to a vehicle structure via the wheel guide member, wherein the wheel mount can be adjusted about an axis extending essentially parallel to the plane of the wheel, and the wheel guide member is coupled to the wheel mount at a distance (that is to say spaced apart) from the axis.

According to a further exemplary embodiment of the invention, the steering device also has a steering control unit for controlling the wheel guide member, wherein the steering control unit has a first acquisition unit for a basic steering function and an actuator travel control system. The first acquisition unit for the basic steering function serves to acquire a first steering angle setpoint value and receives input signals from sensors for this purpose, wherein the input signals represent at least the vehicle speed and the driver steering angle. The actuator travel control system serves to adjust a travel of the wheel guide member on the basis of the first steering angle setpoint value.

In this context it should be noted that additional modules can also be connected between the first acquisition unit and the actuator travel control system in order, for example, to integrate steering interventions on the part of the driver or functions above and beyond the steering system.

According to a further exemplary embodiment of the invention, the steering device also has a sensor device for making available measurement data from the surroundings of the vehicle, wherein the measurement data are also included in the acquisition of the setpoint value for the wheel steering angle of the wheel.

According to a further exemplary embodiment of the invention, the sensor device may be a radar sensor, a lidar sensor, an optical sensor or an ultrasonic sensor. Combinations of these types of sensor can also be provided and also be included in the acquisition of the setpoint value for the wheel steering angle.

According to a further exemplary embodiment of the invention, the sensor device also has a position-determining unit with a satellite navigation receiver and a digital map.

The satellite navigation receiver can be designed for a global navigation satellite system (GNSS) such as, for example, GPS, Galileo, GLONASS (Russia), Kompass (China), IRNSS (India).

The additional information from the digital map can be used, paired with precise position details relating to the current position of the vehicle, to generate safety-related data which are also included in the acquisition of the setpoint value for the wheel steering angle of the wheel.

For example, it may indicated on the digital map that there is oil or foliage on the roadway.

If an avoidance maneuver is necessary, said maneuver can be assisted at a correspondingly earlier time since severe changes in direction are not possible in this case.

According to a further exemplary embodiment of the invention, the sensor device is designed to determine a distance between the vehicle and an object.

The object is, for example, another vehicle or some other obstacle.

According to a further exemplary embodiment of the invention, the steering device also has an analysis unit for analyzing the measurement data and for detecting a hazardous situation on the basis of the analysis, wherein the steering system is designed to adapt the steering function to a hazardous situation if a hazardous situation has been detected.

For example, in the case of a vehicle setting which acts in the opposite direction, the problem may arise that although the vehicle has a high degree of agility in the speed range in question, this can, however, then lead to excessively agile driving behavior, for example in the case of an avoidance maneuver due to an emergency situation or hazardous situation, wherein the driving stability which is necessary in this situation can be adversely affected to a high degree.

In order to overcome this conflict of objectives, the steering system of the electromechanical rear-wheel steering system can be networked to a surroundings sensor system, for example a radar sensor, in the vehicle. For example, in vehicles with inter-vehicle distance control systems, such a radar sensor is a component of this system. Information relating to the distance from vehicles traveling ahead or generally from objects located in front of the vehicle is then also available to the ARK system or can be made available to the ARK system and also used by it. By taking into account this additional sensor information, the vehicle setting for the ARK (and therefore for the entire vehicle) can be then be adapted to the detected hazardous situation. This is advantageous in particular if a setting which acts in the opposite direction or a setting which acts only slightly in the same direction has been selected as the vehicle setting.

According to a further exemplary embodiment of the invention, a vehicle having a steering device described above is disclosed.

According to a further exemplary embodiment of the invention, the use of the steering device described above in a vehicle is disclosed.

According to a further exemplary embodiment of the invention, a method for adjusting a wheel steering angle of a wheel of a motor vehicle is disclosed, in which method a length of a central wheel guide member is changed, and the wheel steering angle of the wheel is changed by the wheel guide member, wherein the change in length of the wheel guide member brings about the change in the wheel steering angle of the wheel.

According to a further exemplary embodiment of the invention, a program element is disclosed which, when executed on a processor, induces the processor to carry out the steps specified above.

According to a further exemplary embodiment of the invention, a computer-readable medium is disclosed on which a program element is stored which, when executed on a processor, induces the processor to carry out the method steps specified above.

Preferred exemplary embodiments of the invention are described below with reference to the figures.

DETAILED DESCRIPTION OF THE PREFERRED EMBODIMENTS

The illustrations in the figures are schematic and not to scale.

In the following description of the figures, the same reference numbers are used for the same or similar elements.

Figure 1:
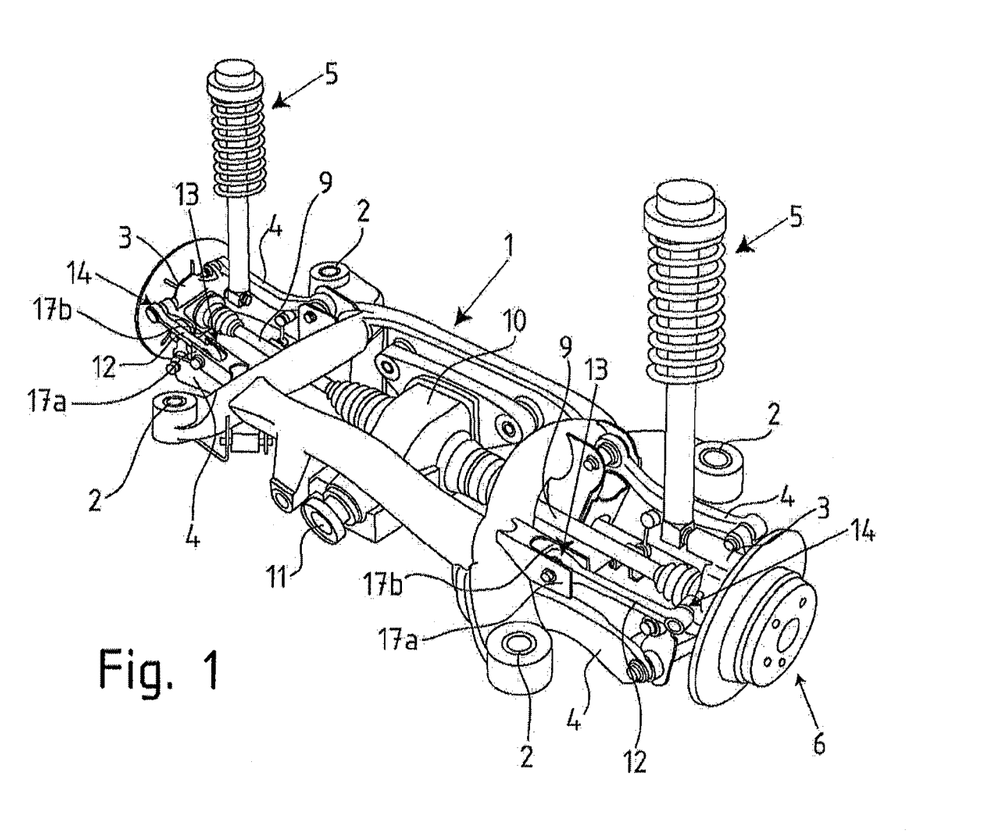
FIG. 1 shows a rear-axle integral mount.

FIG. 1 shows a rear-axle integral mount for a driven rear axle of a motor vehicle, such as is known per se from the prior art. It has an auxiliary frame 1 which is connected at attachment points 2 to a bodywork (not illustrated in FIG. 1) of the vehicle. Wheel mounts 3 are connected in an articulated fashion to the auxiliary frame 1 via wheel control arms 4. In addition, in each case a spring strut 5 for providing support on the vehicle bodywork is mounted permanently on the wheel mounts 3. In addition, wheel bearings 6 which are mounted on the wheel mounts are illustrated in FIG. 1. The rear wheels of the vehicle which can be mounted on the wheel mounts 3 or the wheel bearings 6 are respectively driven by a wheel drive shaft 9. The wheel drive shafts 9 are connected to one another here via a differential gear mechanism 10 which has a flange 11 which is directed forward in the longitudinal direction of the vehicle for the flange-connection of a shaft which is driven by the vehicle engine.

In addition, between the auxiliary frame 1 and the wheel mounts 3 there is in each case a steering tie rod 12 of fixed length, which steering tie rods 12 are each connected by a pivot bearing 13, 14 to the auxiliary frame 1, on the one hand, and the wheel mount 3, on the other.

Figure 2:
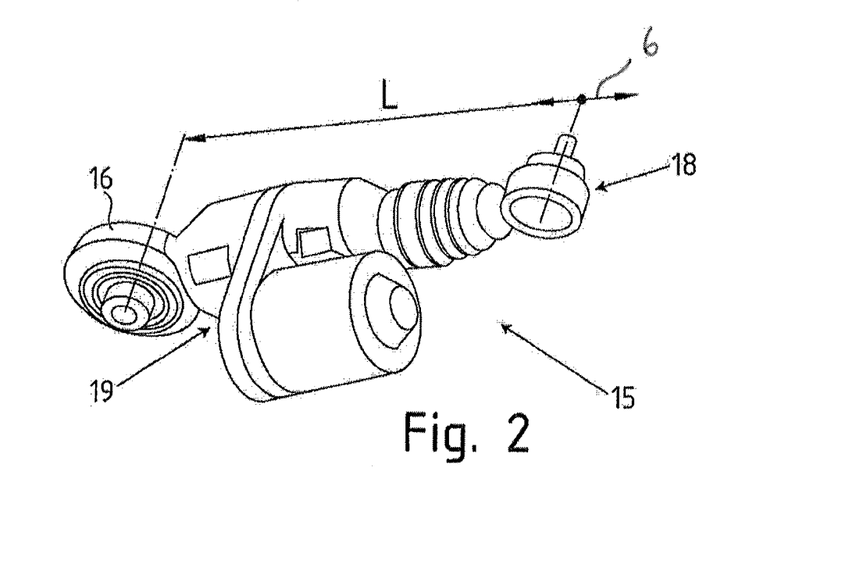
FIG. 2 shows a wheel guide member with adjustable length.

The invention provides for the use of an individual actuator (wheel guide member 15), which has an adjustable length, for adjusting the wheel steering angle. A wheel guide member 15 (see FIG. 2) is therefore installed between the steering tie rods 12 (see FIGS. 5 and 6).

The wheel guide member 15 has, for the purpose of attachment to the auxiliary frame 1, a bearing center web 16 which, together with the bearing side webs 17a, 17b (FIG. 1) of the auxiliary frame 1, forms the pivot bearing 13. The wheel-mount-side joint 18, which forms the pivot bearing 14, can be used to couple the two wheel mounts 3 individually by means of the wheel guide member 15 which has a variable length.

The bearing center web 16 is attached to a housing 19 which contains a motor with which a push rod 51 can be moved in the distal and proximal directions by means of a gear mechanism, in order to lengthen or shorten the wheel guide member 15. The wheel-mount-side joint 18 is arranged on the push rod 51 here.

The wheel steering angle of the rear wheels which are mounted on the wheel mounts 3 can be changed by means of the change in length. In the illustrated embodiment, in particular when the steering tie rod lengthens there is a change in the wheel steering angle in the direction of the toe-in, and when it shortens there is a change in the direction of toe-out. In the embodiment of the invention illustrated in FIG. 1, the rotational axes of the steering movement run along the longitudinal extent of the spring struts 5.

It is generally not necessary to modify the other wheel control arms 4, since wheel suspension systems usually permit the wheels to be pivoted in the direction of the toe-in and in the direction of the toe-out. In this context, in particular wheel steering angles which lie in the region of the wheel steering angles owing to an elasto-kinematic steering movement and which are already sufficiently large to effectively influence the vehicle movement dynamics can be implemented here without further modifications. However, it is also equally possible to provide for the wheel suspension system to be modified in such a way that larger steering angles are possible.

Figure 3:
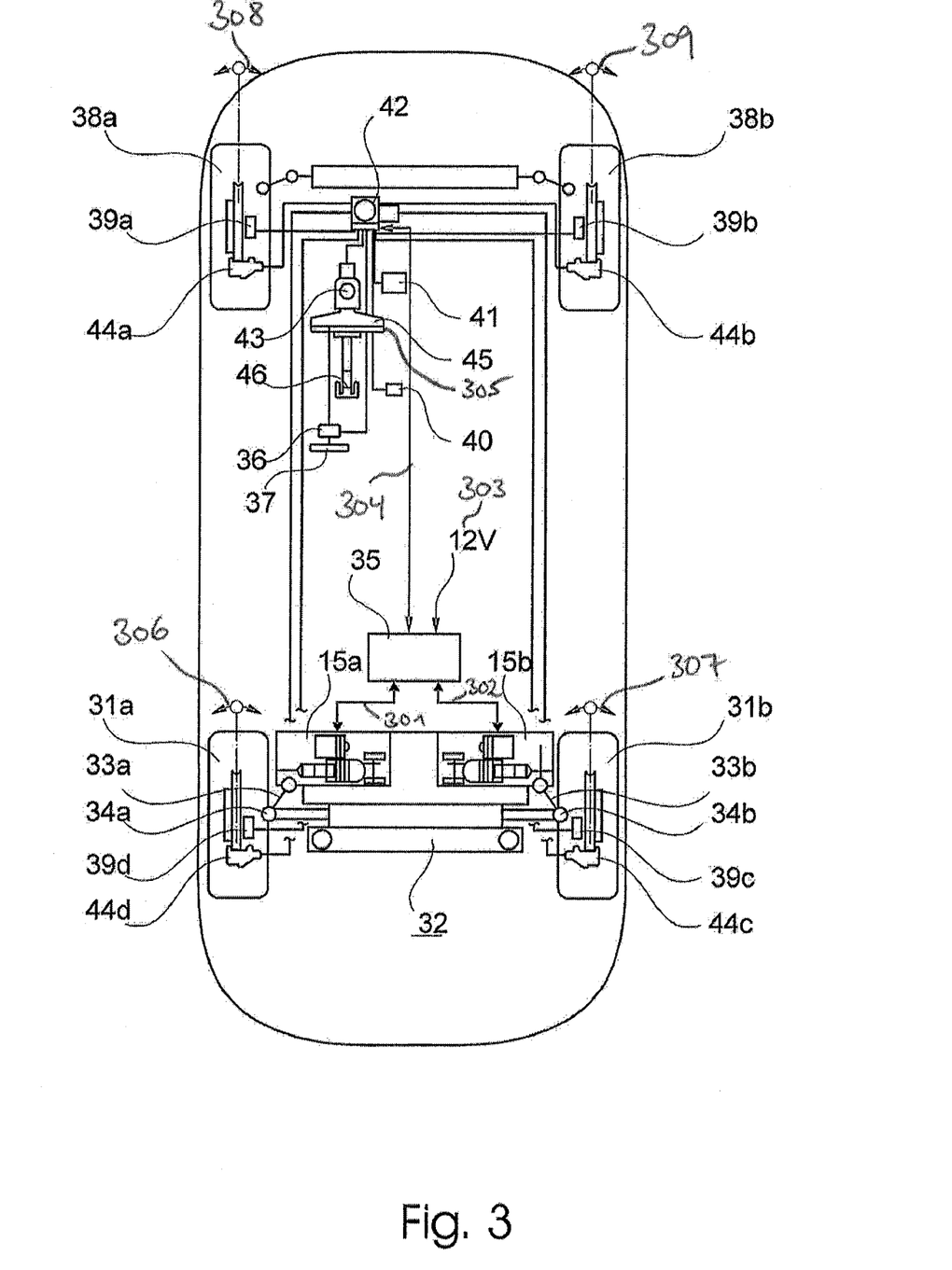
FIG. 3 is a schematic illustration of an ARK system arrangement (steering device) with two individual, decentralized wheel guide members.
Figure 5:
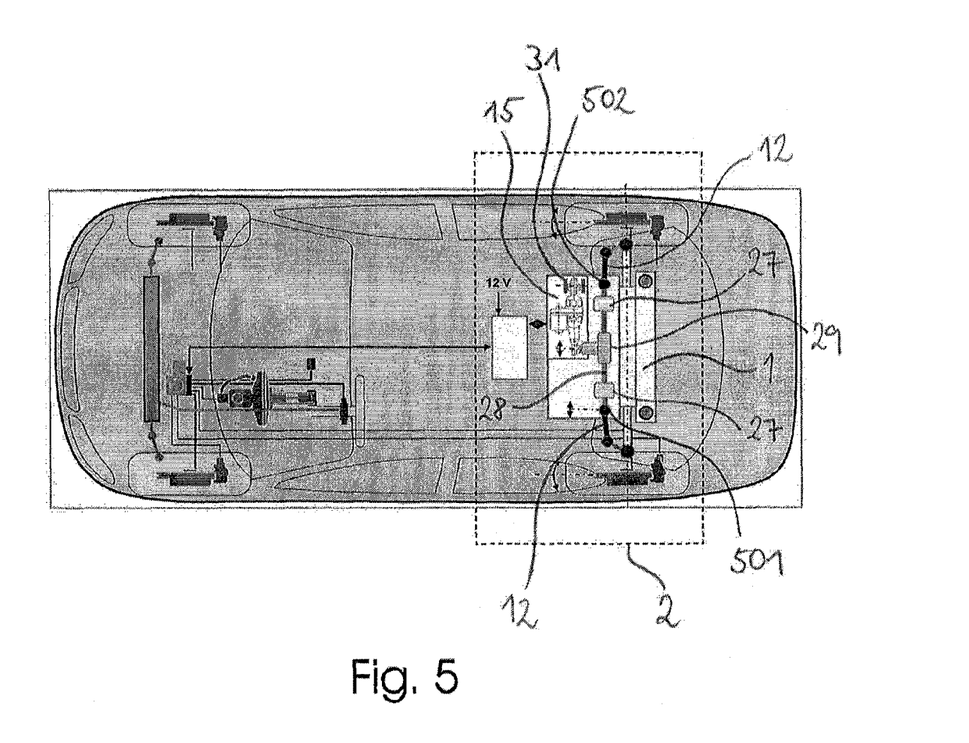
FIG. 5 shows an ARK system arrangement with a central wheel guide member according to an exemplary embodiment of the invention.

FIGS. 3 and 5 show two rear-wheel steering systems (ARK) which each have two individual actuators or one central actuator.

The rear-wheel steering system in FIG. 3 has already been described in detail in WO 2006/117343 and will be considered below only to the extent necessary. The wheel-specific steering movement of the two rear wheels 31a, 31b is brought about here by means of a steering tie rod 51, which can be adjusted electromechanically by means of 2 electric motors, of the rear-axle integral mount.

FIG. 3 shows, in a schematic illustration, a four-wheel motor vehicle with a left-hand rear wheel 31a and a right-hand rear wheel 31b. The rear wheels 31a, 31b are attached to the vehicle by means of a rear-axle mount 32. Each rear wheel 31a, 31b is assigned a wheel guide member 15a and 15b, respectively. The length of the two wheel guide members 15a and *b* can be respectively adjusted. The steering tie rods engage on the rear wheels 31a, 31b via levers 33a, 33b (illustrated schematically in the figure) such that said rear wheels 31a, 31b can be pivoted about an angle by virtue of changes in length of the wheel guide members 15a and 15b with respect to a pivoting axis 34a, 34b. The levers 33a, 33b result from the fact that the steering tie rods 15a and 15b engage on the wheel mounts outside the center points thereof.

The wheel guide members 15a and 15b are actuated by a rear-axle steering control unit 35 to which the wheel guide members 15a and 15b are respectively connected via an electronic interface. The rear-axle steering control unit 35 is supplied here by means of the 12 volt supply voltage of the on-board power system of the vehicle. Control commands for actuating the motor of the wheel guide members 15a and 15b, on the one hand, and signals from travel sensors which sense the position of the push rod inside the housing of the steering tie rod, on the other hand, can in particular be transmitted via the interface. The respectively current wheel steering angle of the rear wheels 31a, 31b can be acquired from said signals inside the rear-axle steering control unit 35. The two wheel guide members 15a and 15b can constitute here independent modules which can be actuated independently of one another such that basically a freely selectable wheel steering angle can be set at each rear wheel 31a, 31b. The actuation is carried out by means of a control method as a function of different vehicle variables which are measured, in particular, by using sensors. The sensor system of a vehicle movement dynamics control system, for example of an ESP (Electronic Stability Program) system is preferably used to carry out the control method. Said sensor system usually comprises a steering angle sensor 36 for sensing the steering angle which the driver has set at the steerable front wheels 38a, 38b by means of a steering handle 37, a wheel speed sensor 39a, 39b, 39c, 39d at each wheel of the vehicle, a pedal travel sensor 40 for sensing the position of the accelerator pedal, and a yaw rate sensor or a sensor cluster 41 which contains a yaw rate sensor, a lateral acceleration sensor and a longitudinal acceleration sensor.

These signals are usually received in an ESP control unit and evaluated. The ESP control unit is usually integrated with an electrohydraulic unit for carrying out braking interventions in an assembly 42. In this context, the master brake cylinder 43 of the hydraulic vehicle brake system is connected to the wheel brakes 44a, 44b, 44c, 44d via the electrohydraulic unit. In this context, the brake pressure which is built up by the driver via the brake booster 45 by means of a brake activation device 46 can be modified on a wheel-specific basis using electronically controllable valves. In addition, the hydraulic unit has a pressure build-up device with which braking interventions for stabilizing the vehicle can be performed independently of the driver, said braking interventions being controlled by the ESP control unit by means of a control method which is known per se to a person skilled in the art.

In the embodiment illustrated in FIG. 3 an interface for transmitting signals between the ESP control unit and the rear-axle steering control unit 35 is provided. The transmission of signals can be carried out here, for example, via a databus system, such as the CAN (Controller Area Network) which is usually employed in motor vehicles.

The interface can be used to transmit the signals of the ESP sensor system to the rear-axle steering control unit 35 which generates setpoint value specifications for the wheel steering angles of the rear wheels 31a, 31b and/or the lengths of the steering tie rods 15a, 15b as a function of the sensor signals by means of a control method. It may also equally be provided that these setpoint value specifications are determined in the ESP control unit and transmitted via the interface to the rear-axle steering control unit 35 which then actuates the steering tie rods 15a, 15b in accordance with the setpoint value specifications.

Basically, the rear wheels 31a, 31b can be steered here in the same direction or in the opposite direction with respect to the steering movement of the front wheels 38a, 38b. Steering the rear wheels 31a, 31b and the front wheels 38a, 38b in the opposite direction reduces the curve radius, while the steering angle at the front wheels 38a, 38b stays the same, and therefore an increase in the agility of the vehicle can be obtained. If the rear wheels 31a, 31b are steered in the same direction as the front wheels, the yaw rate of the vehicle is reduced, and therefore the vehicle can be stabilized in critical driving situations.

In other words, according to aspects of the invention the conventional steering tie rod 12 of the rear-axle integral mount 1, which steering tie rod has a fixed wheel base, is therefore replaced with the steering tie rod which has an adjustable length L (or with two adjustable steering tie rods).

A structural change in the rear-axle integral mount 1 is not necessary here. The change in length L of the adjustable steering tie rod is implemented electromechanically. The detection of the actual value of the change in length L is carried out by means of a travel sensor 77, 78 which is integrated into the adjustable wheel guide members 15a and 15b.

The two adjustable wheel guide members 15a and 15b in FIG. 3 are independent modules which are each connected to the rear-axle steering control unit 35 via an electronic interface 301, 302. For its part, the rear-axle steering control unit 35 is supplied with the supply voltage 303 of the on-board power system and is connected to the ESP control unit via an electronic interface 304.

Vehicle movement dynamics data (for example vehicle speed, yaw rate, acceleration data, steering angle etc.) of the vehicle which are available in the ESP control unit 305 can be accessed by the interface 304.

The rear-axle steering control unit 35 generates, from said data, the setpoint value specifications for the steering tie rod lengths which are to be applied for the two adjustable wheel guide members 15a and 15b. The change in length L of the adjustable steering tie rods results in a steering movement 306, 307 of the two rear wheels 13a, 13b about their center of rotation 34a, 34b.

In this context, depending on the requirement of the rear-axle steering control unit, the steering angle of the rear wheels can be implemented in the same direction as or in the opposite direction from the steering movement 308, 309 of the front wheels 38a, 38b.

A steering movement of the rear wheels in the opposite direction reduces the steering radius, while a steering movement of the rear wheels in the same direction reduces the yaw rate of the motor vehicle.

Figure 4:
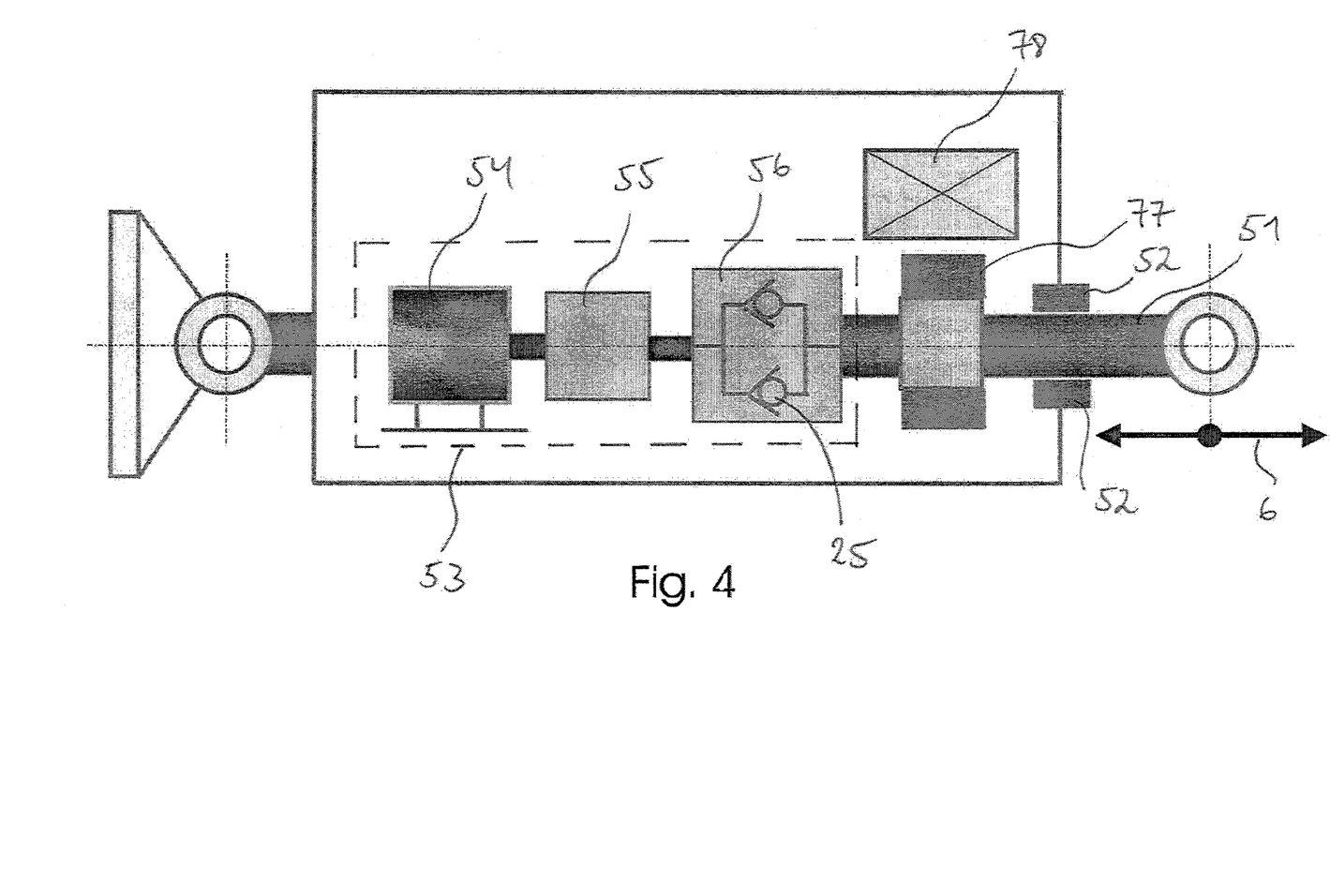
FIG. 4 is a schematic illustration of the design of the wheel guide member with adjustable length in FIG. 2.

FIG. 4 is a schematic illustration of the design of the steering tie rod 15 in a preferred embodiment of the invention. As is apparent from FIG. 4, the bearing center web 16 is permanently mounted on the housing 19. The joint 18 is attached to the distal end of the push rod 51, which can be shifted inside the housing and is guided by axial bearings 52. In order to shift the push rod 51, the tie rod 15 contains an electromechanical drive assembly 53. The latter comprises an electric motor 54 whose motor shaft is coupled via a speed-changing gear mechanism 55 to a rotational/translational gear mechanism 56 which converts the rotational movement of the motor shaft into a translational movement of the push rod 51, and is preferably embodied as a threaded drive. Depending on the direction of rotation of the motor shaft, the push rod 51 is moved in the distal direction or proximal direction.

The drive unit 53 also optionally has a blocking device 56 which is embodied in such a way that the push rod 51 can be shifted within the housing 19 exclusively by using the electric motor 54. In one embodiment of the invention, the speed-changing gear mechanism 55 and/or the rotational/translational gear mechanism 56 has here a self-locking device which brings about such blocking.

For example, the electromechanical drive 53 of the push rod 51 which can be adjusted electromechanically is therefore embodied by means of an electric motor 54, a speed-changing gear mechanism 55 and a rotational/translational gear mechanism 56 with a self-locking device or a freewheel 25 which acts in two ways.

That is to say the electromechanically adjustable wheel guide members 15a and 15b can be adjusted only on the motor side. When the motor 54 is not energized, the push rod 51 go into the self-locking device or are blocked mechanically by the alternatively used freewheel 25 which is effective on both sides.

Figure 6:
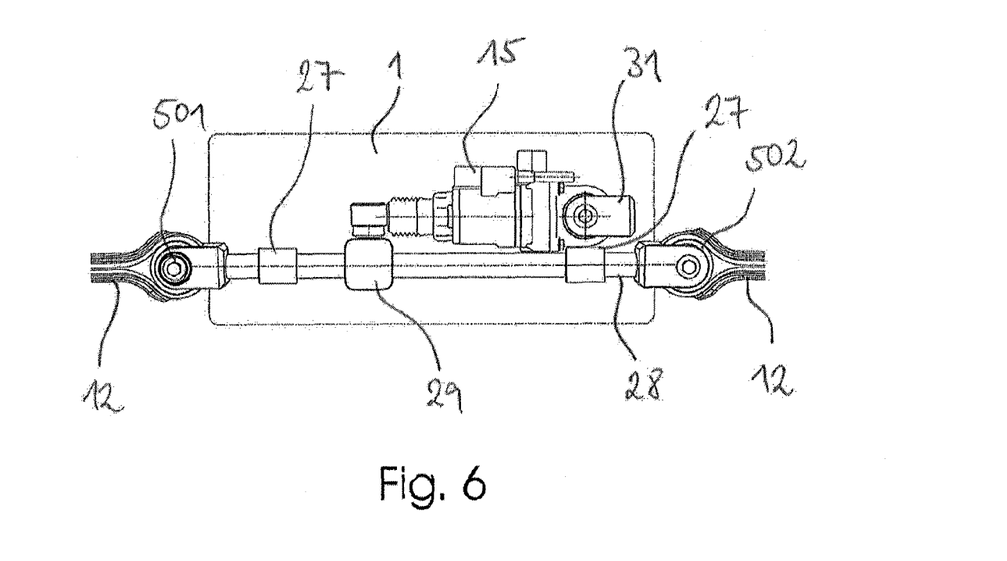
FIG. 6 shows a detail from the ARK system arrangement in FIG. 5.

As illustrated in FIGS. 5 and 6, as an alternative to this, the two wheel guide members 15a and 15b in FIG. 3 can also be replaced, in certain rear-axle designs, by a central wheel guide member 15 (individual actuator).

In this context the two steering tie rod ends 501, 502 of the steering tie rods 12 which exist in the integral mount 1 are shifted in a linear and synchronous fashion by means of a steering rod 28 which is mounted in the integral mount 1 via the steering rod bearings 27.

The wheel guide member 15 is coupled via a coupling element 29. For its part, the wheel guide member 15 is supported on the integral mount 1 by means of a joint bearing 31 and therefore transmits the activation forces of the steering rod 28.

This may permit a cost advantage since just one actuator and just one electronic box are necessary. Furthermore, the need to synchronize a plurality of individual actuators can be dispensed with.

It is to be noted that the adjustable steering tie rods can be used both for the front wheels and for the rear wheels.

Figure 7:
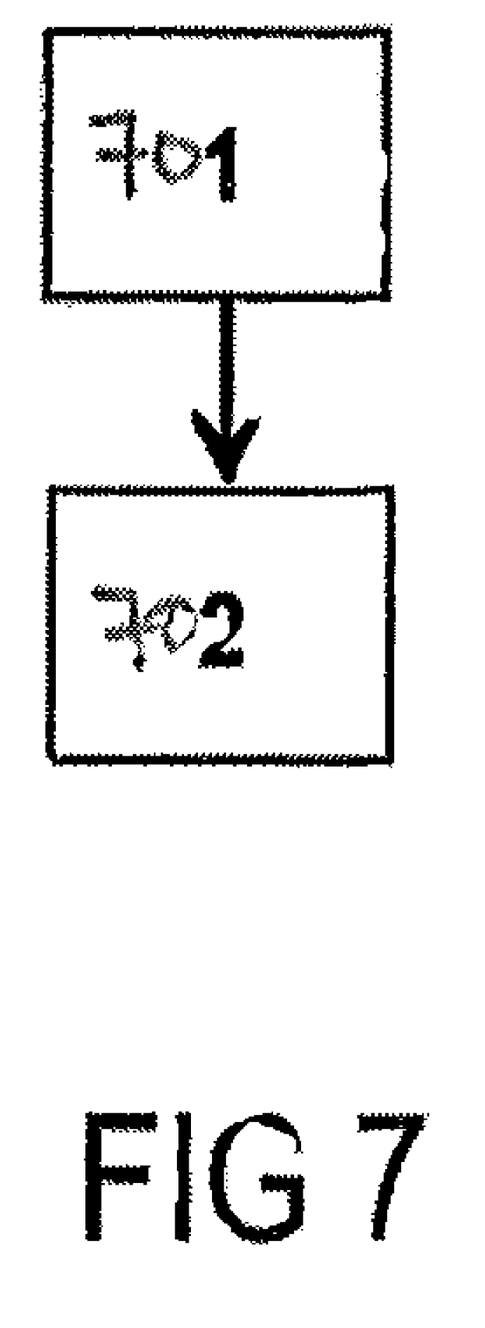
FIG. 7 is a flowchart of a method according to an exemplary embodiment of the invention.

FIG. 7 is a flowchart of a method in which, in a first step 701, the length of a central wheel guide member is changed. In a second step 702, the wheel steering angle of the wheel is changed by the central wheel guide member, wherein the change in length of the wheel guide member brings about the change in the wheel steering angle of the wheel.

In addition it is to be noted that "comprising" and "having" do not exclude other elements or steps and "a" does not exclude a plurality. In addition, it is to be noted that features or steps which have been described with reference to one of the above exemplary embodiments can also be used in combination with other features or steps of other exemplary embodiments described above.

The invention claimed is:

1. A steering device for adjusting a wheel steering angle of a wheel of a motor vehicle, the steering device comprising:
    a central wheel guide member for changing the wheel steering angle of the wheel;
    a steering tie rod with a first steering tie rod end and a second steering tie rod end, wherein the wheel guide member is configured to perform linear, synchronous shifting of the steering tie rod ends; and
    a joint bearing, wherein the wheel guide member is attached to an integral mount of the steering device via the joint bearing,
    wherein a length of the wheel guide member can be adjusted;
    wherein a change in length of the wheel guide member brings about a change in the wheel steering angle of the wheel; and
    wherein the wheel guide member is coupled to the steering tie rod ends via a coupling element and via the steering tie rod.

2. The steering device as claimed in claim 1,
    wherein the wheel guide member has a drive unit; and
    wherein the length of the wheel guide member can be adjusted by way of the drive unit.

3. The steering device as claimed in claim 1, wherein the wheel is a rear wheel of the motor vehicle.

4. The steering device as claimed in claim 1, further comprising a wheel mount for mounting the wheel, wherein the wheel mount is connected to a vehicle structure via the wheel guide member, and wherein the wheel mount can be adjusted about an axis extending substantially parallel to a plane of the wheel, and the wheel guide member is coupled to the wheel mount at a distance from the axis.

5. The steering device as claimed in claim 1, further comprising a steering control unit for controlling the wheel guide member,
   wherein the steering control unit has a first acquisition unit for a basic steering function and an actuator travel control system,
   wherein the first acquisition unit for the basic steering function receives input signals from sensors in order to acquire a first steering angle setpoint value,
   wherein the input signals represent at least a vehicle speed $V_{hfz}$ and a driver steering angle $\delta_{Driver}$, and
   wherein the actuator travel control system is configured to adjust a travel of the wheel guide member on a basis of the first steering angle setpoint value.

6. The steering device as claimed in claim 1, further comprising a sensor device for making available measurement data from surroundings of the vehicle, which measurement data are also included in an acquisition of a setpoint value for the wheel steering angle of the wheel.

7. The steering device as claimed in claim 6,
   wherein the sensor device is configured to determine a distance between the vehicle and an object.

8. A vehicle having a steering device as claimed in claim 1.

9. The use of a steering device as claimed in claim 1 in a vehicle.

10. A method for adjusting a wheel steering angle of a wheel of a motor vehicle, the method comprising the steps of:
    changing a length of a central wheel guide member, wherein the wheel guide member is coupled to a first steering tie rod end and a second steering tie rod end via a coupling element and via a steering tie rod and wherein the wheel guide member is further attached to an integral mount via a joint bearing; and
    changing the wheel steering angle of the wheel by the central wheel guide member wherein changing the length of the wheel guide member performs a linear, synchronous shifting of a first tie rod end and a second tie rod end to bring about the change in the wheel steering angle of the wheel.

11. A program element which, when executed on a processor, induces a processor to carry out the following steps:
    changing a length of a central wheel guide member, wherein the wheel guide member is coupled to a first steering tie rod end and a second steering tie rod end via a coupling element and via a steering tie rod and wherein the wheel guide member is further attached to an integral mount via a joint bearing; and
    changing a wheel steering angle of the wheel by the central wheel guide member, wherein changing the length of the wheel guide member performs a linear, synchronous shifting of a first tie rod end and a second tie rod end to bring about the change in the wheel steering angle of the wheel.

12. A computer-readable non-transitory medium on which a program element is stored, which, program element, when executed on a processor, induces the processor to carry out the following steps:
    changing a length of a central wheel guide member, wherein the wheel guide member is coupled to a first steering tie rod end and a second steering tie rod end via a coupling element and via a steering tie rod and wherein the wheel guide member is further attached to an integral mount via a joint bearing; and
    changing the wheel steering angle of the wheel by the central wheel guide member, wherein changing the length of the wheel guide member performs a linear, synchronous shifting of a first tie rod end and a second tie rod end to bring about the change in the wheel steering angle of the wheel.

* * * * *